Figure 1:
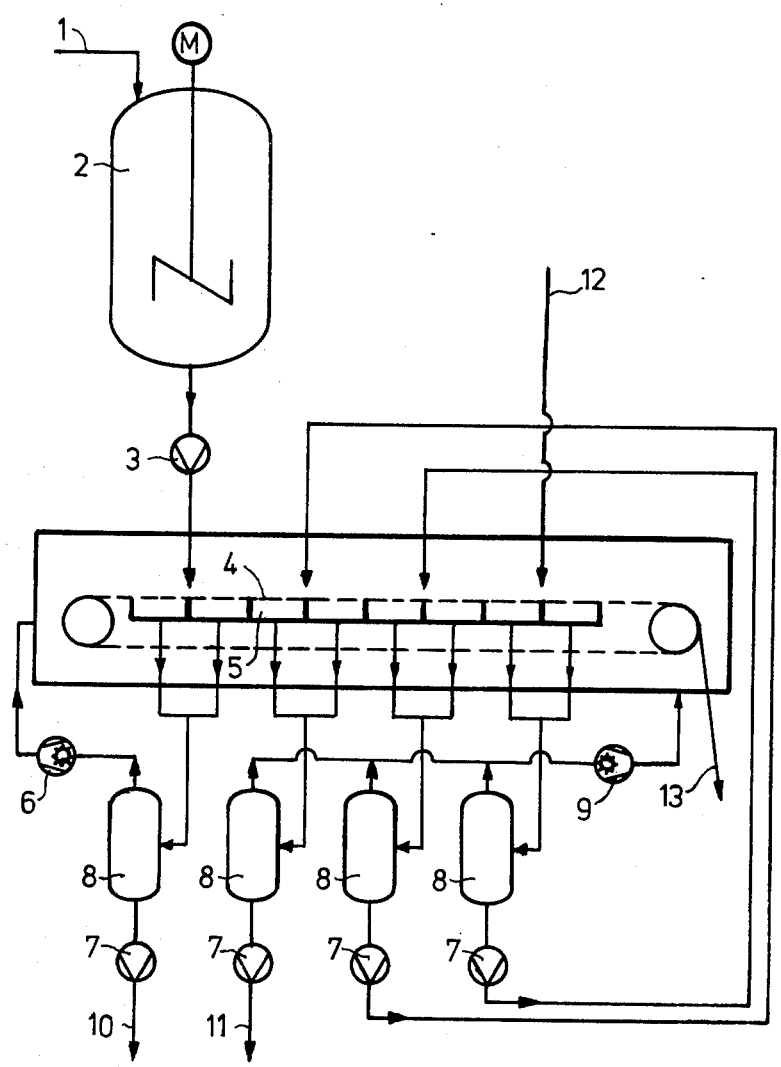

United States Patent [19]

Bernert et al.

[11] 4,404,370
[45] Sep. 13, 1983

[54] PURIFICATION OF CELLULOSE AND STARCH ETHERS WITH COUNTER CURRENT WASHING

[75] Inventors: Claus-Rüdiger Bernert, Walsrode; Volker Hartwig, Fallingbostel; Christian Kords, Walsrode; Detmar Redeker, Cologne, all of Fed. Rep. of Germany

[73] Assignee: Wolff Walsrode AG and Bayer AG, Leverkusen, Fed. Rep. of Germany

[21] Appl. No.: 323,576

[22] Filed: Nov. 23, 1980

[30] Foreign Application Priority Data

Nov. 27, 1980 [DE] Fed. Rep. of Germany ....... 3044696

[51] Int. Cl.³ .................. C08B 11/20; C08B 31/08
[52] U.S. Cl. ........................... 536/85; 536/96; 536/98; 536/99; 536/111
[58] Field of Search ................... 536/85, 111

[56] References Cited

U.S. PATENT DOCUMENTS

| 3,498,971 | 3/1970 | Blaga | 536/98 |
| 3,873,518 | 3/1975 | Strange et al. | 536/91 |
| 4,048,433 | 9/1977 | Burns et al. | 536/99 |
| 4,229,572 | 10/1980 | Zweigle | 536/89 |
| 4,296,235 | 10/1981 | Ziche | 536/85 |

FOREIGN PATENT DOCUMENTS 2017454 10/1971 Fed. Rep. of Germany.

Primary Examiner—A. Lionel Clingman
Attorney, Agent, or Firm—Connolly and Hutz

[57] ABSTRACT

A process for the purification and isolation of cellulose or starch ethers wherein directly after the etherification step the suspension agent and the extraction of the ether product with the purifying agent is carried out on the same continuously working filter.

6 Claims, 1 Drawing Figure

PURIFICATION OF CELLULOSE AND STARCH ETHERS WITH COUNTER CURRENT WASHING

This invention relates to a continuous process for purification and working-up of cellulose or starch ethers.

Cellulose and starch ethers, for example sodium carboxymethyl cellulose, hydroxyethyl cellulose, methyl cellulose, methyl hydroxypropyl cellulose, carboxymethyl starch and ethyl hydroxyethyl cellulose, are produced by treating the cellulose ot starch with sodium hydroxide and by subsequent etherification at elevated temperature with one or more compounds, such as monochloroacetic acid, ethylene oxide, methyl chloride, propylene oxide or ethyl chloride.

This etherification reaction is accompanied by the formation of side products such as salts, for example sodium chloride, sodium glycolate or sodium acetate, which have to be removed from the cellulose or starch ether before it is used.

Purification is normally carried out with hot water when the ether flocculates in it as in case of methyl cellulose and many of its mixed ethers. When this flocculation does not occur in water at elevated temperature, as in case of carboxymethyl cellulose, carboxymethyl starch, hydroxyethyl cellulose and methyl cellulose produced using large quantities of epoxide, a water-miscible compound, for example methanol, ethanol or isopropanol, has to be added to the water. The concentration of the alcohol is adjusted such that maximum solubility of the salts is guaranteed whilst the reaction product itself is not dissolved, i.e. between about 45 and 75% by weight, depending upon the type of alcohol used and the working temperature applied.

According to conventional purification process (German Offenlegungsschriften Nos. 1,801,553 and 2,457,187=U.S. Pat. No. 3,875,518) the moist crude ether product is made into a paste with a suitable alcohol/water mixture or with hot water and is separated off after different residence times using centrifuges, decanters, drum filters, plate filters or band filters. Alternatively, it is possible (for example according to German Patent No. 2,017,454) to purify the dried, salt-containing product in granulate form in a countercurrent extractor. Whereas this particular process is attended by the disadvantage that the necessary intermediate drying step is expensive in terms of energy consumption, purification of the moist product is attended by the disadvantage of long extraction times, according to the pretreatment. Thus, in some production processes where the etherification step is carried out in an organic solvent, the organic solvent used is not necessarily identical with the purification agent. For example, the etherification of cellulose with ethylene oxide may be carried out in isopropanol, whereas a mixture containing methanol is required for the purification step. The production of carboxymethyl cellulose or carboxymethyl starch follows similar lines insofar as the etherification step is preferably carried out in isopropanol, tert-butanol or mixtures of ethanol with hydrophibising solvents, for example benzene or toluene, whilst a mixture of methanol or ethanol with water is used for the purification.

The ethers are worked up normally by separating off the etherification agent by filtration or centrifuging, drying the reaction product and making a moist paste of it with the purification agent, followed by isolation of the reaction product. On account of the increase in density of the ether during the removal of the suspension agent and the increase in particle size and skin formation brought about by evaporation of the solvent, the dissolving times during extraction for purification are by no means short, ranging from 15 minutes in the batch process (U.S. Pat. No. 3,498,971) to an average of more than 60 minutes in the continuous extraction process. In addition, in view of the stringent purity requirements, one extraction step is usually insufficient so that the product has to be extracted in countercurrent frequently up to three times.

The process according to the invention eliminates the need for intermediate drying and the preparation of pastes and leads directly to a highly purified cellulose or starch ether because of the combination of the separation step of the suspension agent and extraction steps of the ether.

The present invention therefore relates to a continuous process for the purification and isolation of cellulose or starch ether suspensions prepared in known manner by filtering off the suspension agent extracting the reaction product with a purifying agent different from the suspension agent and drying the ether under suction, wherein immediately after the etherification step the cellulose or starch ether is filtered off from the suspension agent and then is extracted in countercurrent with the purifying agent at least once on the same continuous by working filter.

By using the process according to the invention preferably cellulose or starch ethers of the type which do not flocculate in hot water can be purified. Preferably are these ethers like carboxymethyl cellulose, hydroxyethyl cellulose, carboxymethyl starch or methyl hydroxypropyl cellulose and methyl hydroxyethyl cellulose containing so many hydroxyethyl or hydroxypropyl groups that flocculation in hot water no longer occurs.

The purifying agents or extractants preferably used are the known water/alcohol mixtures, for example, water and methanol or ethanol mixtures.

The water content should be between 20% and 40% by weight, depending on the type of cellulose ether to be purified. In order to purify ethers which swell too heavily in the binary systems of water and methanol or ethanol and, hence, are difficult to filter, for example hydroxyethyl cellulose and certain mixed ethers of methyl cellulose, isopropanol is added to the purification agents.

The continuous purification process according to the invention is preferably carried out by delivering the cellulose or starch ether suspension to a continuously working, filtering off the suspension agent under suction by applying reduced pressure to the underneath of the filter, optionally drying the filter cake of the ether formed under suction, distributing the purification agent over the solid cake, filtering off the salt-containing purification agent under suction and then drying the thus purified ether under suction.

Allowing for the fact that the suspension agent has only minimal salt dissolving ability which is insufficient for purification and for the fact that, where separation of the ether product and re-formation of the paste are carried out separately, dissolving times of from 15 to more than 60 minutes are necessary for obtaining a highly purified product, it was surprising to find that, according to the inventive process only few seconds are sufficient on the continuously working filter for separation of the ether and its purification.

The solids concentration of the suspension obtained after etherification may be varied within wide ranges limited by the need for fluidity and by economic considerations. A solids concentration of from 5% to 20% is preferred.

After the suspension agent has been filtered off, the ether cake is preferably dried under suction to a residual moisture content of from 40 to 70% by weight and extracted and purified in countercurrent in the following washing zone by delivery of the purification agent to the filter. The washing agent may be delivered to the ether on the filter in one or more zones, whereby the filtrate drawn through is re-used in another zone of the filter. Extraction is carried out in countercurrent at least once and preferably three times.

The washing zone is followed by a suction-drying zone into which steam or hot nitrogen may also be introduced. The ether is then separated off from the filter and further processed.

Suitable filters are those whose surface can be clearly divided into individual zones, for example plate filters, vacuum drum, pressure drum and band filters of suitable size. Drum filters have an advantage over plate filters in that they may be divided into zones of equal length. Band filters are preferably used for the process according to the invention.

The process according to the invention is particularly advantageous by virtue of its low consumption of purification agent. By virtue of the countercurrent principle, the ratio of cellulose or starch ether to washing agent may be less than 1:10. Even with a ratio of 1:7, it is still possible to obtain very good purification effects.

FIG. 1 illustrates the arrangement of a band filter. From the stirrer-equipped vessel (2), the suspension (1) of the crude ether is pumped onto the band filter (pump 3) and treated with the purifying agent (12). The filtrate passes through the circulating filter band (4) into one of the suction cells (5) which communicate with the vacuum pumps (6,9) through the filtrate-separators (8). The filtrate (11) is returned by the filtrate pumps (7) to the next washing zone and, after passing through all the zones, is worked up. The suspension medium (10) is drained off. The purified ether (13) is worked up in known manner.

EXAMPLE 1

A suspension, originating from the etherification stage, of 10% by weight of carboxymethyl cellulose in a mixture of 88% by weight of isopropanol and water is delivered through a suction cell to a vacuum drum filter 500 mm long and 700 mm in diameter at a rate of 1900 l/h. The surface of the drum is divided into twenty zones. The filtrates can be separately removed through a control head. The rotational speed amounts to approximately 1 min$^{-1}$. After separation of the mother liquor and drying under suction, the product is subjected to countercurrent extraction in two zones with 1600 l/h of a mixture of 65% of methanol and 35% of water introduced through nozzles. The washing medium which now contains salts is separately run off and the solvent circuit is closed by regeneration.

The remaining filter zones serve as a suction drying zone. The 20 mm thick cake is stripped from the filter by means of a knife. The purified carboxymethyl cellulose still has a moisture content of 61.5% and a sodium chloride content of 0.45% by weight. It may be directly dried.

EXAMPLE 2

As described in Example 1, a neutralised suspension of 10% by weight of hydroxyethyl cellulose in a mixture, emanating from the etherification step, of 90% of isopropanol and 10% of water is freed from the suspension medium in a vacuum drum filter at a rate of 1900 l/h and, after drying under suction, is washed in countercurrent in two washing zones with 1500 l/h of a mixture of 30% of isopropanol, 35% of methanol and 30% of water. The product, which has a residual moisture content of 65%, contains 0.12% by weight of sodium acetate.

EXAMPLE 3

1000 l/h of a carboxymethyl cellulose suspension having the same composition as described in Example 1 are delivered to a band filter 3200 mm long and 250 mm wide. Arranged below the filter band are 8 suction cells with which a total of 2 vacuum pumps and 4 filtrate pumps are associated. An approximately 700 mm long suction-drying zone is followed by 2 or 3 extraction zones, as set forth in Table 1, to which 700–1000 l/h of a 65% methanol are delivered in countercurrent. The speed of travel of the filter band is between 16 and 38 mm/s.

The following results were obtained at the end of the suction-drying zone:

TABLE 1

| Extraction Zones | 2 | 2 | 3 | 3 | 3 |
|---|---|---|---|---|---|
| Purification agent (l/h) | 1000 | 700 | 1000 | 850 | 700 |
| Ether thickness (mm) | 16 | 18 | 20 | 17 | 18 |
| Ether moisture (% by weight) | 58 | 62 | 65 | 60 | 61 |
| NaCl-content of the ether-cake (% by weight) | 0.23 | 0.55 | 0.10 | 0.17 | 0.29 |

EXAMPLE 4

The procedure is as described in Example 3 using 1000 l/h of the water-diluted distillate of the spent washing agent which consists of a mixture of 22% by weight of isopropanol, 43% by weight of methanol and 35% by weight of water. The resulting NaCl-content of the cake amounts to 0.12% by weight.

EXAMPLE 5

530 l/h of a suspension of 18% by weight of carboxymethyl starch in a mixture of 89% by weight of isopropanol and 11% by weight of water are delivered to the band filter described in Example 3. Washing in three washing zones with 760 l/h of a mixture of 25% by weight of isopropanol, 45% by weight of methanol and 30% by weight of water gives a purified product containing 0.33% by weight of residual NaCl.

EXAMPLE 6

The procedure is as described in Example 3 using 850 l/h of a mixture of 68% by weight of ethanol and 32% by weight of water delivered in countercurrent to 3 washing zones. The resulting NaCl-content amounts to 0.29% by weight.

We claim:
1. A process for the continuous purification and isolation of a cellulose or starch ether suspension which comprises filtering off the suspension agent, extracting the reaction product with a purifying agent different from the suspension agent and drying it under suction, wherein directly after the etherification step without any intermediate drying and the preparation of pastes the suspension agent is filtered off and the reaction product is extracted in countercurrent with the purifying agent at least once on the same continuously working filter.

2. A process as claimed in claim 1, wherein the filter is a band filter circulating at a speed of from 10 to 100 mm/s.

3. A process as claimed in claim 2, wherein the band filter circulates at a speed of from 15 to 40 mm/s.

4. A process as claimed in claim 1, wherein the purifying agent is a water/alcohol mixture with a water content of between 20% and 40% by weight.

5. A process as claimed in claim 1, wherein the purified cellulose or starch ether is also dried under suction at the same continuously working filter used for the purification step.

6. A process as claimed in claim 1, wherein the ratio of cellulose or starch ether to the purification agent is $\leq 1:10$.

* * * * *

UNITED STATES PATENT AND TRADEMARK OFFICE
CERTIFICATE OF CORRECTION

PATENT NO. : 4,404,370

DATED : September 13, 1983

INVENTOR(S) : Claus-Rudiger Bernert et al

It is certified that error appears in the above-identified patent and that said Letters Patent is hereby corrected as shown below:

In the title page, item "[22]" should read --[22] filed: November 23, 1981--.

Signed and Sealed this

Fourteenth Day of February 1984

[SEAL]

Attest:

Attesting Officer

GERALD J. MOSSINGHOFF

Commissioner of Patents and Trademarks